Patented Aug. 4, 1953

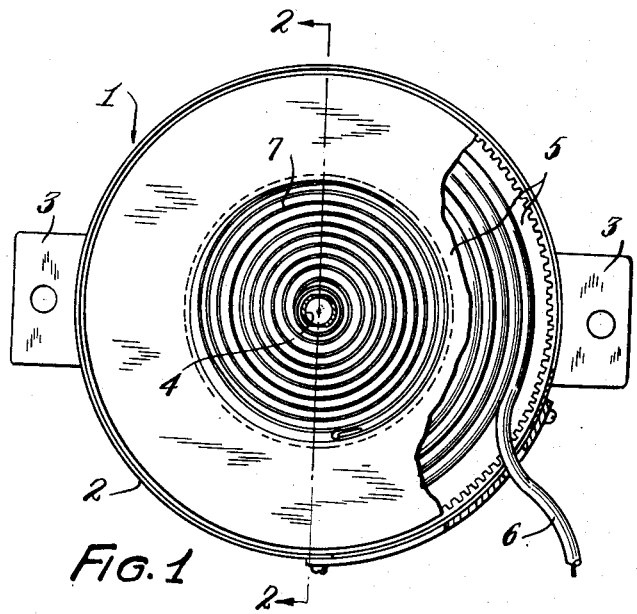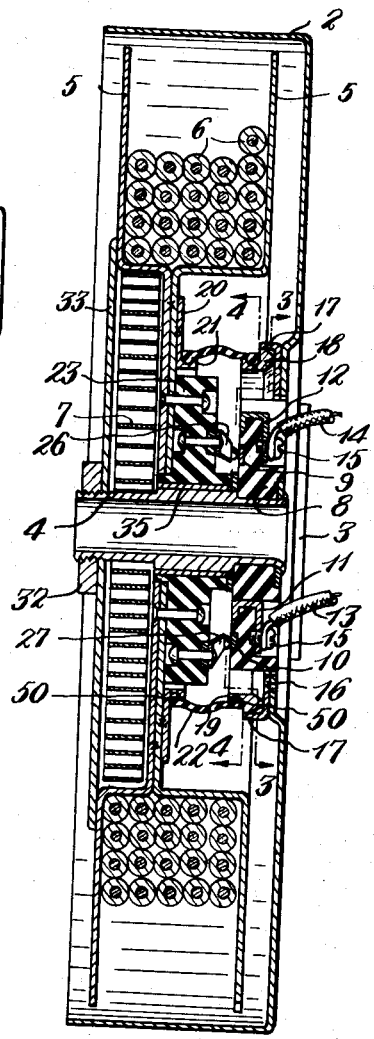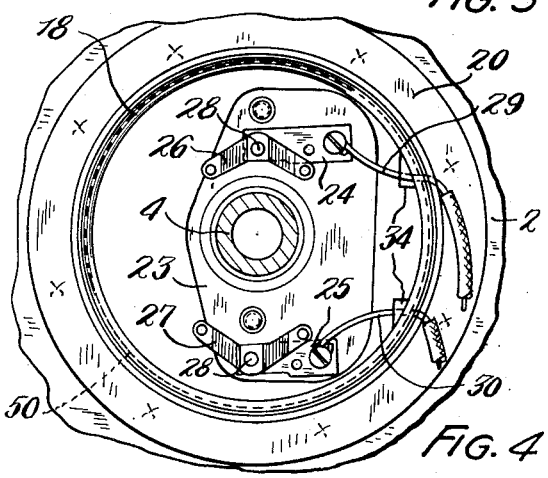

2,647,960

UNITED STATES PATENT OFFICE 2,647,960

WEATHERPROOF REEL FOR ELECTRIC CORDS OR THE LIKE

David Benjamin, Cleveland, Ohio, assignor to Benjamin Reel Products Inc, Cleveland, Ohio, a corporation of Ohio Application August 31, 1950, Serial No. 182,501

3 Claims. (Cl. 191—12.4)

This invention relates to reel means for electric cords, especially to a weather or moisture proof type of reel adapted for safe use when exposed to the weather, or other adverse operating conditions.

Heretofore it has been very desirable to use portable electric cords in various places many of which expose the electric cord to appreciable moisture, or else may even expose the cords and associated means directly to the weather. It has been difficult, if not impossible to position these retractible electric cords in such a way that electrical energy can safely be transmitted to the cords because of the dampness of the connections provided and results dangers to the electrical circuit.

This invention relates to reels of the type disclosed in U. S. Letters Patent Nos. 2,306,611 and 2,462,296. These reels are of the general type wherein a variable length of an electrical conductor cord is required by the person using a portable electric device such as an electric drill, light or other article being supplied with power by the electric cord. The reels usually are provided with spring means which automatically will retract undesired lengths of cord drawn from the reel. While use of this type of a reel has been rapidly increasing in the last several years, some installations have had difficulty in transmitting electrical energy to the electric cord contained upon the reel due to moisture or dampness in the atmosphere or from other substances wetting the reel and its associated means and causing short circuits in the electric circuit and results damage or danger to the reel and the associated means.

The general object of the present invention is to overcome the foregoing and other difficulties with previous types of reels in special uses of same, and to provide a reel which is characterized by the weather-proof, or substantially moisture-proof construction of the reel and its associated means.

Another object of the invention is to provide a novel type of a reel which has sealing means associated therewith for protecting the contacts between stationary and rotary parts of the reel from the weather and the atmosphere in which the reel is used.

Yet another object of the invention is to provide a reel which is adapted to be substantially moisture-proof and insulate the electrical connection portions of the reel at either high or low temperatures, and with variations in same.

Still another object of the invention is to provide a reel that can be used around chemical plants, or around gasoline, or in humid conditions without seriously affecting the operative characteristics and insulation properties of the reel.

Another object of the invention is to use a relatively thin gauge, wide, resilient member for forming a seal between a rotary and a stationary part of a reel and for protecting the electrical contacts of the apparatus from the atmosphere.

Yet another object of the invention is to provide a reel of the type described wherein the reel is of sturdy construction and which requires little or no maintenance thereon to maintain a weather-tight construction in the reel, and which reel will automatically compensate or adjust with slight wear in the components of the reel.

Another object of the invention is to enclose the operative contact parts in a reel of the class described in a resilient weather-tight portion of the reel.

The foregoing and other objects and advantages of the invention will be made more apparent as the specification proceeds.

For a better understanding of the present invention, reference should be had to the accompanying drawings wherein one presently best known embodiment of the invention is shown, and wherein:

Fig. 1 is an elevation, partially broken away, of a reel of the invention;

Fig. 2 is an enlarged vertical section taken on line 2—2 of Fig. 1; and

Figs. 3 and 4 are fragmentary vertical sections taken on lines 3—3 and 4—4, respectively, of Fig. 2.

Attention is directed to the details of the structure shown in the drawings, and a reel is indicated by the numeral 1 and includes a substantially cup-shaped base plate 2 which has a pair of diametrically opposed lugs or anchor plates 3 suitably secured thereto or formed integrally therewith. The base plate 2 also has a hub 4, or shaft which is suitably secured thereto and extends therefrom normally thereto at the center of the base plate. This hub 4 is adapted to support a drum 5 for rotation thereon and positions the drum, or spool within the margins of the base plate 2. The drum 5 is provided with a circumferentially open portion for receiving and storing lengths of an electrical connector or cord 6 of which a variable length of cord is intermittently adapted to be stored on the drum 5, as different lengths of cord are pulled from or replaced on the reel 1. Usually a suitable coil spring 7 is associated with the reel 1 for aiding the desired automatic wind-up action of cord on the drum 5, as more clearly and completely shown and described in the U. S. Letters Patent referred to hereinabove.

The base plate 2 has an insulating block or disc 8 suitably secured thereto. This insulating block 8 carries a pair of slip or contact rings 9 and 10 in or on the axially inner face thereof, which rings are concentrically positioned with relation to the hub 4. The rings 9 and 10 are radially spaced with relation to each other and are secured to the block 8 by any conventional means. Fig. 2 clearly shows that suitable terminals 11 and 12 are secured to, or formed on the rings 9 and 10, respectively, and extend axially therefrom for engagement with power supply leads 13 and 14, respectively, by conventional means such as screws 15. The base plate 2 also has suitably secured thereto or formed integrally therewith, as desired, a contact plate 16 of appreciably smaller diameter than the base plate 2. This contact plate 16 has a peripheral flange, base ring, or positioner ring 17 formed thereon and the ring 17 is divided into a plurality of circumferentially spaced segments for purposes that will be hereinafter described.

As an important feature of this invention, a sealing ring 18, which usually is formed from metal, is carried by the drum 5 and extends axially therefrom, being resiliently pressed against the contact plate 16 immediately adjacent the flange or base ring 17 formed thereon. The sealing ring 18 has an axially directed flange 19 formed on the side thereof remote from the base plate 2, which flange 19 is of slightly reduced external diameter with relation to the remaining portion of the sealing ring 18.

A positioning ring 20 is usually provided and is suitably secured, as by spot welding, to one side face of the drum 5. A circumferential flange or sleeve 21 extends axially from the ring 20 towards the base plate 2. The external diameter of the flange 21 is normally exactly equal to the external diameter of the flange 19, and as a salient part of the invention, a resilient sleeve 22 is secured to the surfaces of the flanges 19 and 21 and extends therebetween in order to position the sealing ring 18 on the drum 5. This sleeve 22 usually is of relatively thin gauge, but of relatively great width, or length and is made from a suitable resilient material. Usually natural rubber, rubber-like material, or synthetic rubber, such as neoprene, is used to make the sleeve 22 and when used in this description and claims, the term "rubber" is taken in its broadest possible sense to mean any substance like those mentioned hereinabove, or any combinations of these materials. The sleeve 22 usually is cemented to the flanges 19 and 21 but may be secured thereto in other manners, if desired. The sleeve 22 usually is only between about .010 to .020 inch in thickness.

A second insulator or contact block 23 is suitably secured to the side face of the drum 5 within the periphery of the sleeve 22. This block 23 has contact plates 24 and 25, Fig. 4, suitably secured thereto and resilient contact fingers indicated at 26 and 27 are secured to the contact plates 24 and 25, respectively, by rivets 28 and extend resiliently therefrom. These contact fingers 26 and 27 are so positioned that such pair of contact fingers bears upon one of the contact or slip rings 9 and 10 positioned on the base plate 2 whereby electrical contact can be established between the rotating drum 5 and the stationary part of the reel 1. Leads 29 and 30 are suitably secured to the contact plates 24 and 25 by terminal screws 31 and these leads 29 and 30 extend through the sleeve 22 up through a suitable slot or opening provided in the drum 5 for deposit as the cord 6 upon the periphery of the drum 5.

Fig. 2 shows that a nut 32 may be engaged with the hub 4 for retaining the drum 5 in engagement with the base plate 2. A suitable cover plate 33 is positioned over a portion of the drum 5 to retain the coil spring 7 in its desired position, and is retained in place by the nut 32.

It will be appreciated that other specific means from those disclosed and described herein may be used in practice of the invention and thus it may not be necessary to use a contact plate 16 in all embodiments of the invention, whereas obviously it would be possible to secure the resilient sleeve 22 to the drum 5 by other specific means from those shown herein, such as by an integral base flange on the sleeve 22.

Bosses 34 are provided on the sleeve 22 and have slits provided therein for passage of the leads 29 and 30 therethrough without interfering with the moisture-proof assembly of this portion of the reel. The bosses 34 are usually much thicker and heavier in gauge than the remaining parts of the sleeve to aid in forming the seal around the leads 29 and 30.

In assembling the different components of the reel 1, usually the rubber sleeve 22 is compressed about $\frac{1}{16}$ of an inch to maintain a force urging the sealing ring 18 into tight engagement with the contact plate 16 or other portion of the base plate 2 that it engages.

The flange 17 formed on the contact plate 16 snugly receives the sealing ring 18 therein and aids in positioning same and retaining it in tight or fixed relation to the base plate. The drum 5 may be considered to have a frame provided therefor and a positioning sleeve or hub 35 is provided at the radially inner portion of the drum 5 to position same on the hub 4. This sleeve 35 usually should be insulated from the remainder of the drum.

Inasmuch as the reel 1 may be subjected to excessive moisture conditions, and moisture may even be deposited within the inner portion of the reel, by cutting the flange 17 into circumferential segments, the inner portion of the reel 1 can be automatically drained. Otherwise, the electrical contacts positioned within the reel 1 will be maintained in substantially weather-tight relation to the rest of the reel and the atmospheric conditions will not be able to enter the enclosure formed by the sleeve 22 to damage or short circuit the electrical contacts provided in the interior of the reel. As wear occurs in the different components of the reel, the inherent elasticity and resiliency of the sleeve 22 will permit the sealing ring 18 to be constantly and continually urged against the associated surface of the base plate 2, whereby a sealing relationship can be maintained between the stationary and rotary components of the reel. In some instances, it may be desirable to secure the rubber sealing ring to the stationary part of the reel and have the sealing ring bear on the rotary member of the reel.

The rubber sleeve 22 preferably has beads 50 formed on each edge thereof and protruding radially inwardly of the reel. The beads 50 seat in complementary shaped recesses provided in the sealing ring 18 and the positioning ring 20 by which the sleeve 22 is positioned to aid in forming a seal therewith.

In view of the foregoing, it is thought that a novel, effective type of a reel has been provided which is of an efficient and weather-proof construction whereby the objects of the invention have been achieved.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. In a reel for electric cord or the like, a base plate, a hub secured to said base plate and extending therefrom, means forming a base ring on said base plate protruding therefrom axially inwardly concentrically with said hub and lying radially therebeyond, a drum for receiving and storing electric cord thereon journalled on said hub, a wear resistant low friction sealing ring rotatably carried by and bearing on said base plate and snugly engaging said base ring, a resilient deflectible sleeve secured to said drum and to said sealing ring to aid in positioning said sealing ring and to produce rotation of said sealing ring with said drum, and electric contact means operatively connecting said drum and said base plate within the periphery of said sleeve.

2. A reel as in claim 1 wherein said sleeve has thickened radially inwardly extending positioning beads provided thereon at each end thereof, and means are operatively associated with said drum and said base plate to engage said beads and position said sleeve.

3. A reel as in claim 1 wherein said base ring is not continuous and a plurality of drain openings are provided therein.

DAVID BENJAMIN.

References Cited in the file of this patent
UNITED STATES PATENTS

| Number | Name | Date |
|---|---|---|
| 743,346 | Swain | Nov. 3, 1903 |
| 1,261,193 | Van Deventer | Apr. 2, 1918 |
| 1,931,732 | Fageol et al. | Oct. 24, 1933 |
| 2,013,733 | Murphy | Sept. 10, 1935 |
| 2,127,544 | Von Holtz | Aug. 23, 1938 |
| 2,167,986 | Lignian et al. | Aug. 1, 1939 |
| 2,458,153 | Festge | Jan. 4, 1949 |
| 2,512,749 | McCloskey | June 27, 1950 |